United States Patent [19]

Nagase et al.

[11] Patent Number: 4,726,345
[45] Date of Patent: Feb. 23, 1988

[54] METHOD AND DEVICE FOR CONTROLLING ENERGIZATION OF HIGH PRESSURE ELECTROMAGNETIC VALVE

[75] Inventors: Masaomi Nagase; Fumiaki Kobayashi; Kiyotaka Matsuno; Yoshiyasu Ito, all of Toyota; Keisuke Tsukamoto, Nagoya, all of Japan

[73] Assignee: Toyota Jidosha Kabushiki Kaisha, Japan

[21] Appl. No.: 835,936

[22] Filed: Mar. 4, 1986

[30] Foreign Application Priority Data

Mar. 4, 1985 [JP] Japan .................................. 60-42144

[51] Int. Cl.$^4$ ............................................ F02M 39/00
[52] U.S. Cl. .................................... 123/506; 123/458; 123/198 DB
[58] Field of Search ................. 123/506, 458, 198 DB, 123/479, 359, 500, 501

[56] References Cited

U.S. PATENT DOCUMENTS

| | | | |
|---|---|---|---|
| 4,395,987 | 8/1983 | Kobayashi | 123/506 |
| 4,480,619 | 11/1984 | Igashira et al. | 123/446 |
| 4,505,240 | 3/1985 | Shinoda | 123/506 |
| 4,519,353 | 5/1985 | Ito | 123/458 |
| 4,546,749 | 10/1985 | Igashira | 123/506 |
| 4,562,810 | 1/1986 | Miyaki | 123/506 |
| 4,574,756 | 3/1986 | Ito | 123/506 |
| 4,602,600 | 7/1986 | Akatsuka | 123/479 |

*Primary Examiner*—Carl Stuart Miller
*Attorney, Agent, or Firm*—Parkhurst & Oliff

[57] ABSTRACT

In controlling a time period of energization of a high pressure electromagnetic valve (50) in accordance with a target value of a fuel injection quantity determined from at least an engine speed (Ne) and an engine load, when a target indicated value (theta) of the time period of energization determined from at least the engine speed and the engine load is lower than a zero indicated value (theta$_0$) of the time period of energization when the fuel injection quantity becomes zero, which is determined from the engine speed, the energization of the high pressure electromagnetic valve is cut off. Therefore, the duty cycle of the high pressure electromagnetic valve is decreased thereby increasing the reliability of the valve. In addition, fuel is reliably cut off when the fuel injection quantity is 0 mm$^3$/st thus avoiding fuel leakage and preventing the generation of white exhaust smoke. Fuel economy can therefore be improved.

3 Claims, 5 Drawing Figures

METHOD AND DEVICE FOR CONTROLLING ENERGIZATION OF HIGH PRESSURE ELECTROMAGNETIC VALVE

BACKGROUND OF THE INVENTION

1. Field of the Invention

This invention relates to a method and device for controlling energization of a high pressure electromagnetic valve, and more particularly to improvements in a method and a device for controlling energization of a high pressure electromagnetic valve, suitable for use in an electronically controlled diesel engine for a motor vehicle, wherein a time period of energization is controlled in accordance with a target value of a fuel injection quantity obtained from at least an engine speed and an engine load.

2. Description of the Background Art

Along with the development in electronic control techniques, particularly, digital control techniques in recent years, a so-called electronically controlled diesel engine, wherein a fuel injection pump is electronically controlled, has been commercialized.

There are various methods of electronically controlling the fuel injection pump, and one of these methods is the method of using a so-called electromagnetic spill type fuel injection pump, wherein spill of fuel in the fuel injection pump is controlled by an electromagnetic valve. In this electromagnetic spill type fuel injection pump, when the fuel injection quantity reaches a target value, a spill port is released to control the end of fuel feed under pressure by a high pressure electromagnetic valve, thus controlling the fuel injection quantity.

A flow control device using a spool valve is disclosed in U.S. Pat. No. 4,480,619.

Control of the energization of an electromagnetic spill valve has heretofore been effected at all times, without considering a target indicated value of a fuel injection quantity determined from at least an engine speed and an engine load. This has been true even when a target value of the fuel injection quantity is 0 mm$^3$/st (cubic milimeters/stroke) and a target indicated value of the fuel injection quantity is zero. Therefore, the electromagnetic spill valve is continuously energized and the duty cycle of the electromagnetic spill valve is increased. Thus, the reliability of the valve is decreased. Furthermore, when the electromagnetic spill valve is actuated, a coil section generates heat thus reducing the reliability of the valve. Further, when control of energization is active, even if the time period of energization is shortened, a small quantity of fuel is injected. This results in the disadvantagous generation of white exhaust smoke and the deterioration of fuel consumption performance. More specifically, if the electromagnetic spill valve is turned on and then off, the electromagnetic spill valve is delayed in response, and the time period during which the valve is closed, is prolonged, whereby inner pressure in the valve plunger is instantaneously raised and the fuel leaks.

SUMMARY OF THE INVENTION

The present invention has been developed to obviate the above-described disadvantages of the background art and has as its object the provision of a method and a device for controlling energization of a high pressure electromagnetic valve, wherein control can be effected only when necessary. Consequently, the duty cycle of the high pressure electromagnetic valve is decreased so as to prevent the generation of heat and to improve reliability, and the fuel is reliably cut off when the fuel injection quantity is 0 mm$^3$/st. Therefore, fuel leakage is avoided, and the generation of white exhaust smoke and lowered fuel consumption performance can be prevented.

To this end, the present invention contemplates that, in a method of controlling energization of a high pressure electromagnetic valve, a time period of energization of which is controlled in accordance with a target value of a fuel injection quantity determined from at least an engine speed and an engine load. The method of the invention is shown in FIG. 1. Specifically, the method comprises:

determining a target indicated value of the time period of energization from at least the engine speed and the engine load;

determining a zero indicated value of the time period of energization when the fuel injection quantity becomes zero, from the engine speed; and cutting off the energization of the high pressure electromagnetic valve when the target indicated value is lower than the zero indicated value.

According to the present invention, in controlling the time period of energization of the high pressure electromagnetic valve in accordance with the target value of the fuel injection quantity determined from at least the engine speed and the engine load, when the target indicated value of the time period of energization determined from at least the engine speed and the engine load is lower than the zero indicated value of the time period of energization when the fuel injection quantity becomes zero, which is determined from the engine speed, the energization of the high pressure electromagnetic valve is cut off. As a consequence, when it is judged from the engine speed that the fuel injection quantity should be zero, the energization of the high pressure electromagnetic valve is cut off. Therefore, unnecessary energization of the high pressure electromagnetic valve is not effected, and the duty cycle thereof is decreased. Thus, the generation of heat in the coil section can be avoided and the reliability of the valve can be improved. Furthermore, when the target value of the fuel injection quantity is 0 mm$^3$/st, the fuel does not leak, the fuel can be reliably cut off and the generation of white exhaust smoke and the deterioration of the fuel consumption performance can be prevented.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of the electronically controlled diesel engine for a motor vehicle, to which is adapted the method of controlling the energization of high pressure electromagnetic valve according to the present invention, with reference to the drawings.

Figure 1:
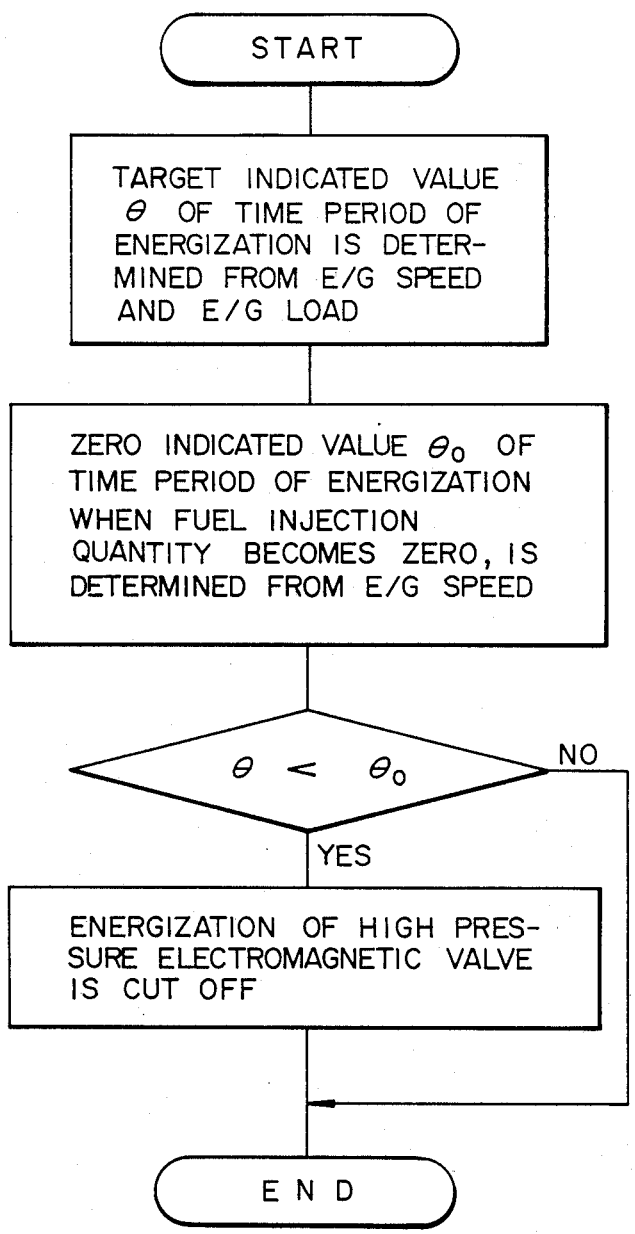
FIG. 1 is a flow chart showing the method of controlling energization of the high pressure electromagnetic valve according to the present invention.
Figure 2:
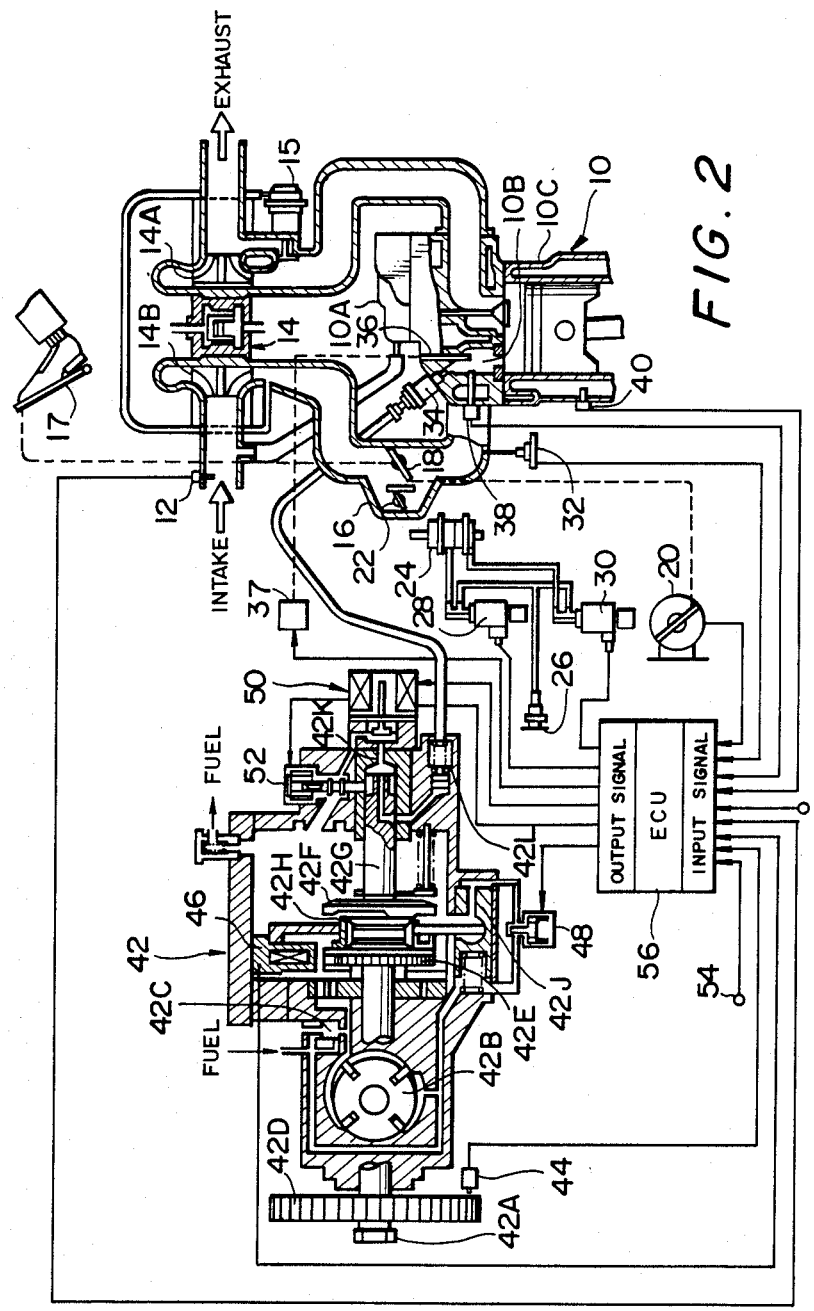
FIG. 2 is a sectional view, partially including a block diagram, showing the general arrangement of the electronically controlled diesel engine for a motor vehicle, to which is applied the present invention.

As shown in FIG. 2, in this embodiment, an intake-air temperature sensor 12 for detecting intake-air temperature is provided at the downstream side of an air cleaner (not shown). Provided at the downstream side of this intake-air temperature sensor 12 is a turbo charger 14 including a turbine 14A rotatable by heat energy of the exhaust gas and compressor 14B rotatable in operational association with this turbine 14A. The upstream side of the turbine 14A of the turbocharger 14 and the downstream side of the compressor 14B are communicated with each other through a waste gate valve 15 for preventing intake-air pressure from being raised excessively high.

Provided in a venturi-flume 16 disposed at the downstream side of the compressor 14B is a main intake-air throttle valve 18 rotatable in a non-linear shape in operational association with an accelerator pedal 17, for restricting an intake-air flowrate during idling and the like. The degree of opening the accelerator pedal 17 (hereinafter referred to as a "accelerator opening") Accp is detected by an accelerator position sensor 20.

Provided in parallel to the main intake-air throttle valve 18 is an auxiliary intake-air throttle valve 22, the opening of which is controlled by a diaphram device 24. Supplied to the diaphram device 24 is vacuum generated in a vacuum pump 26 through a vacuum switching valve (hereinafter referred to as a "VSV") 28 or 30.

Provided at the downstream side of the intake-air throttle valves 18 and 22 is an intake pressure sensor 32 for detecting intake-air pressure.

A cylinder head 10A of a diesel engine 10 is provided with an injection nozzle 34, a glow plug 36 and an ignition timing sensor 38, the forward ends of which are located in an engine combustion chamber 10B. Furthermore, provided on a cylinder block 10C of the diesel engine 10 is a water temperature sensor 40 for detecting the temperature of engine cooling water.

Fuel is fed under pressure to the injection nozzle 34 from an electromagnetic spill type injection pump 42.

The injection pump 42 includes: a driving shaft 42A rotatable in operational association with the rotation of a crankshaft of the diesel engine 10; a feed pump 42B (FIG. 2 shows a state where the pump has moved through 90°) solidly secured to the driving shaft 42A, for giving pressure to the fuel; a fuel pressure regulating valve 42C for regulating fuel feed pressure; a reference position sensor 44 constituted by, for example, an electromagnetic pickup for detecting a reference position, e.g. a top dead center (TDC) from a displacement in rotation of a gear 42D solidly secured to the driving shaft 42A; an engine speed sensor 46 constituted by, for example, an electromagnetic pickup for detecting an engine speed Ne from a displacement in rotation of a gear 42E solidly secured to the driving shaft 42A; a roller ring 42H for reciprocating a face cam 42F and a plunger 42G, and for varying the timing thereof; a timer piston 42J (FIG. 2 shows a state where the timer piston has moved through 90°) for varying a rotary position of the roller ring 42H; a timing control valve (hereinafter referred to as a "TCV") 48 for controlling the position of the timer piston 42J to control the injection timing; an electromagnetic spill valve 50 for varying fuel relief timing from the plunger 42G through a spill port 42K to control the fule injection quantity; a fuel cut solenoid 52 for cutting off the fuel; and a delivery valve 42L for preventing back flow and after-dripping of the fuel.

Glow current is supplied to the glow plug 36 through a glow relay 37.

Outputs from the intake-air temperature sensor 12, the accelerator position sensor 20, the intake pressure sensor 32, the ignition timing sensor 38, the water temperature sensor 40, the reference position sensor 44, the engine speed sensor 46, a glow current sensor 54 for detecting the glow current flowing through the glow plug 36, an air conditioner switch, a neutral safety switch, a vehicle speed signal and the like are inputted to and processed in an electronic control unit (hereinafter referred to as an "ECU") 56. The VSV 28, 30, the glow relay 37, the TCV 48, the electromagnetic spill valve 50, the fuel cut solenoid 52 and the like are controlled by outputs from the ECU 56.

Figure 3:
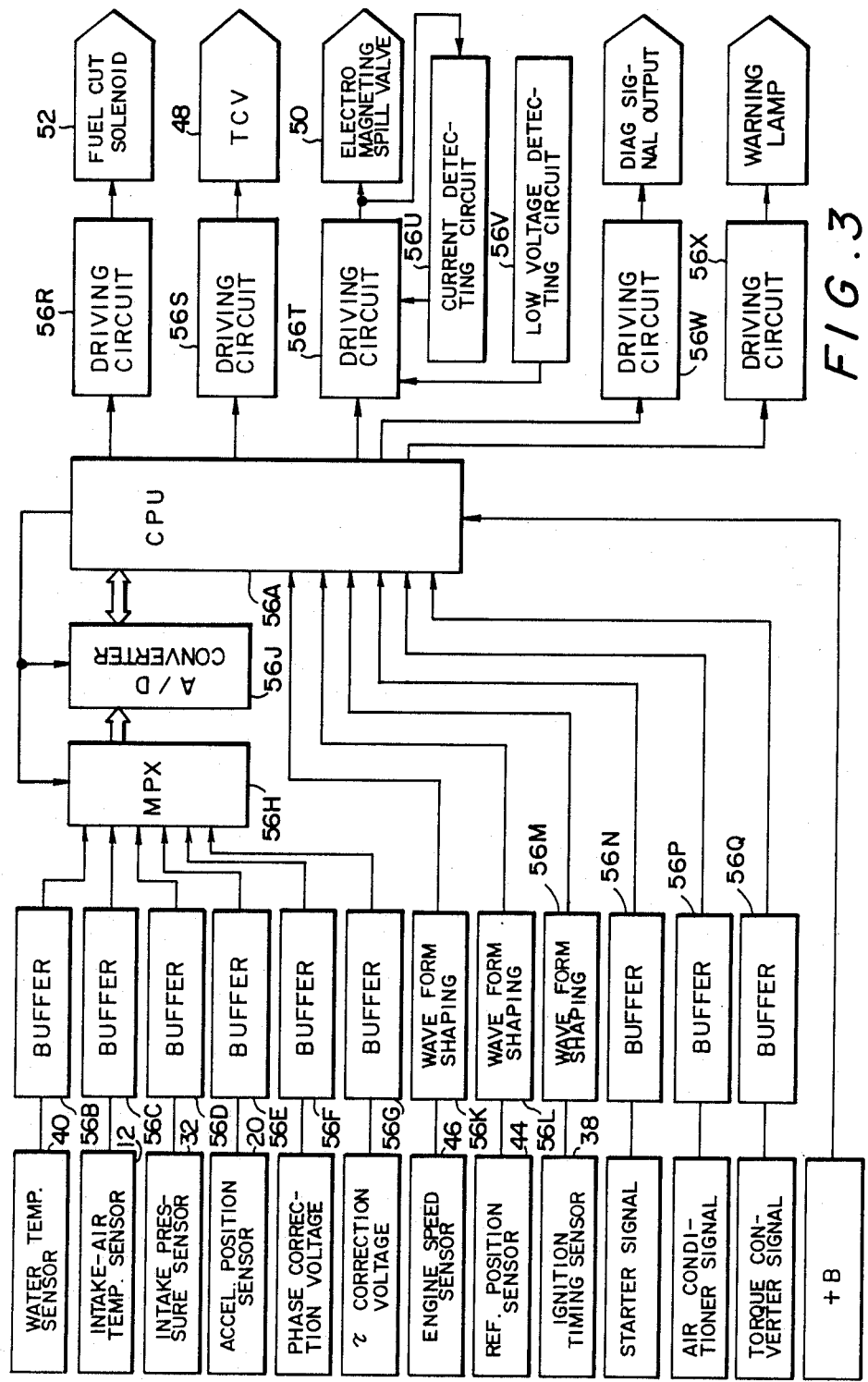
FIG. 3 is a block diagram showing the arrangement of the electronic control unit used in the invention.

As shown in FIG. 3 in detail, the ECU 56 includes: a central processing unit (hereinafter referred to as a "CPU") 56A for performing various calculation processing; a multiplexer (hereinafter referred to as a "MPX") 56H for succesively taking in an output from the water temperature sensor 40, which is inputted through a buffer 56B, an output from the intake air temperature sensor 12, which is inputted through a buffer 56C, an output from the intake pressure sensor 32, which is inputted through a buffer 56D, an output from the accelerator position sensor 20, which is inputted through a buffer 56E, a phase correction voltage signal inputted through a buffer 56F, a tau correction voltage signal inputted through a buffer 56G; an analogue-digital converter (hereinafter referred to as an "A/D converter") 56J for converting analogue signals outputted from the MPX 56H into digital signals and taking the same into the CPU 56A; a wave form shaping circuit 56K for wave form shaping an output from the engine speed sensor 46 and taking the same into the CPU 56A; a wave form shaping circuit 56L for wave form shaping an output from the reference position sensor 44 and taking the same into the CPU 56A; a wave form shaping circuit 56M for wave form shaping an output from the ignition timing sensor 38 and taking the same into the CPU 56A; a buffer 56N for taking a starter signal into the CPU 56A; a buffer 56P for taking an air conditioner signal into the CPU 56A; a buffer 56Q for taking a torque converter signal into the CPU 56A; a driving circuit 56R for driving the fuel cut solenoid 52 in accordance with the result of calculation by the CPU 56A; a driving circuit 56S for driving the TCV 48 in accordance with the result of calculation by the CPU 56A; a driving circuit 56T for driving the electromagnetic spill valve 50 in accordance with the result of calculation by the CPU 56A; a current detecting circuit 56U for detecting a current flowing through the electromagnetic spill valve 50 and feedbacking the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the result of calculation by the CPU 56A; and a driving circuit 56X for driving a warning lamp in accordance with the result of calculation by the CPU 56A.

Here, the aforesaid phase correction voltage signal is the signal for correcting a phase difference between a normal position and the mounted position, which occurs when the reference position sensor 44 is mounted to the injection pump 42. Furthermore, the aforesaid tau correction voltage signal is the signal for correcting a deviation in responsiveness due to a difference between individual parts in the injection pump 42.

Description will hereunder be given of action of one embodiment of the present invention.

Figure 4:
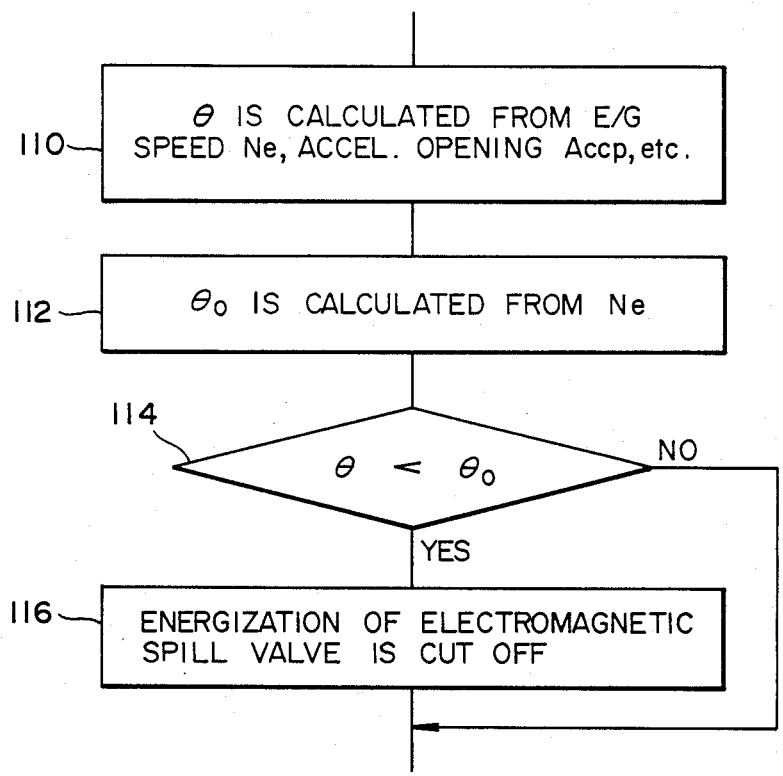
FIG. 4 is a flow chart showing the routine for performing the cut of energization of the electromagnetic spill valve used in the invention.

In this embodiment, cut-off of energization of the electromagnetic spill valve 50 is carried out in accordance with a flow chart shown in FIG. 4. More specifically, the routine proceeds to Step 110 each time upon lapse of a predetermined time period, and, in Step 110, a target indicated value theta of the time period of energization corresponding to a target value of the fuel injection quantity is calculated from an engine speed Ne determined from an output of the engine speed sensor 46 and an accelerator opening Accp determined from an output of the accelerator position sensor 20. It is also possible to make corrections in accordance with an intake pressure signal outputted from the intake pressure sensor 32, an engine cooling water temperature signal outputted from the water temperature sensor 40, an intake-air temperature signal outputted from the intake-air temperature sensor 12 and so on.

Subsequently, the routine proceeds to Step 112, where a zero indicated value $theta_0$ of the time period of energization when the fuel injection quantity becomes zero is calculated from the engine speed Ne by use of the relationship shown in FIG. 5, for example. Subsequently, the routine proceeds to Step 114, where judgment is made as to whether the zero indicated value $theta_0$ thus calculated is lower than the target indicated value theta or not. When the result of judgment is positive and it is judged that there is no need of performing the fuel injection, the routine proceeds to Step 116, where the energization of the electromagnetic spill valve 50 is cut off and this routine is ended.

On the other hand, when the result of judgment in the Step 114 is negative and it is judged that there is need of performing the fuel injection, no energization cut is carried out, the routine is ended, and the control of energization corresponding to the target indicated value theta is effected.

Figure 5:
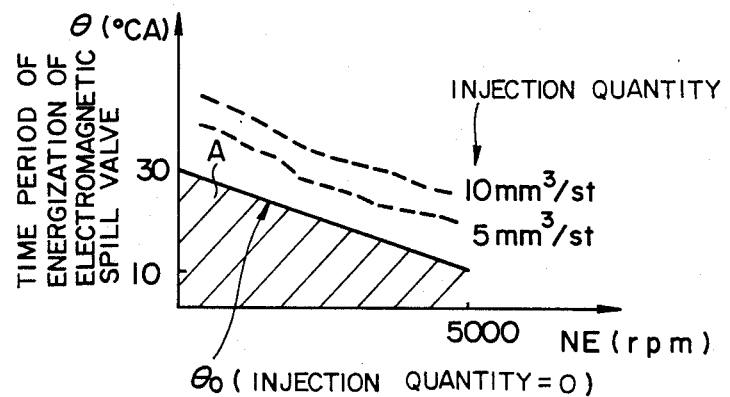
FIG. 5 is a chart showing an example of the relationship between the engine speed and the time period of energization of the electromagnetic spill valve, for explaining a fuel cut region in the invention.

As described above, the energization is cut off in a region shown by hatching A in FIG. 5, where there has heretofore been performed the control of energization of the electromagnetic spill valve 50 in spite of the fact that the fuel injection quantity is zero. Therefore, the duty cycle of the electromagnetic spill valve 50 is decreased, and the generation of heat in the coil section is eliminated, so that the reliability of the valve is improved. Furthermore, the fuel is reliably cut off in the hatched region A, so that the fuel leakage is eliminated, the generation of white exhaust smoke is prevented and the fuel consumption performance is improved.

Additionally, in the above embodiment, the engine load has been detected from the accelerator opening Accp outputted from the accelerator position sensor 20, however, the method of detecting the engine load need not necessarily be limited to this means of detection.

In the above embodiment, the present invention has been applied to the electromagnetic spill valve of a diesel engine. However, the scope of application of the present invention is not limited to this, and, it will be readily apparent to one skilled in the art that the present invention can be applied to any other electromagnetic valve as well, wherein the time period of energization is controlled in accordance with the target value of the fuel injection quantity determined from at least the engine speed and the engine load.

What is claimed is:

1. A method of controlling energization of a high pressure electromagnetic valve, a time period of energization of which is controlled in accordance with a target value of a fuel injection quantity determined from at least an engine speed and an engine load, comprising:
   determining a target indicated value of the time period of energization, which corresponds to the target value of the fuel injection quantity, from at least the engine speed and the engine load;
   determining, from said engine speed, a zero indicated value of the time period of energization when an actual fuel injection quantity becomes zero even if the high pressure electromagnetic value is to be energized according to the target indicated value; and
   preventing useless energization of said high pressure electromagnetic valve when the target indicated value is less than the zero indicated value.

2. A method of controlling energization of a high pressure electromagnetic valve as set forth in claim 1, wherein said engine load is detected from an accelerator opening.

3. A device for controlling energization of a high pressure electromagnetic valve, a time period of energization of which is controlled in accordance with a target value of a fuel injection quantity determined from at least an engine speed and an engine load, comprising:
   means for determining a target indicated value of the time period of energization, which corresponds to the target value of the fuel injection quantity, from at least the engine speed and the engine load;
   means for determining, from the engine speed, a zero indicated value of the time period of energization when an actual fuel injection quantity becomes zero, even if the high pressure electromagnetic valve is to be energized according to the target indicated value; and
   means for preventing useless energization of said high pressure electromagnetic valve when the target indicated value is less than the zero indicated value.

* * * * *